United States Patent [19]

Calandro et al.

[11] Patent Number: 4,837,112
[45] Date of Patent: * Jun. 6, 1989

[54] PROCESS FOR EXTRUSION OF BRAN PRODUCTS

[75] Inventors: Thomas Calandro, Paterson; Robert Straka, Pequannock; Marsha K. Verrico, Fair Lawn, all of N.J.

[73] Assignee: Nabisco Brands, Inc., Parsippany, N.J.

[*] Notice: The portion of the term of this patent subsequent to Jul. 12, 2005 has been disclaimed.

[21] Appl. No.: 16,797

[22] PCT Filed: May 20, 1986

[86] PCT No.: PCT/US86/01081

§ 371 Date: Jan. 14, 1987

§ 102(e) Date: Jan. 14, 1987

[87] PCT Pub. No.: WO86/06938

PCT Pub. Date: Dec. 4, 1986

Related U.S. Application Data

[63] Continuation-in-part of Ser. No. 737,441, May 24, 1985.

[51] Int. Cl.$^4$ ............................................. A23P 1/12
[52] U.S. Cl. .................................... 426/463; 426/450; 426/452; 426/459; 426/560; 426/620
[58] Field of Search ............... 426/549, 560, 618, 619, 426/620, 452, 455, 456, 458, 459, 449, 450, 460, 461, 462, 463, 465, 466, 447, 448, 450, 449

[56] References Cited

U.S. PATENT DOCUMENTS 897,854 9/1908 Schluter, Jr. .
1,173,932 2/1916 Cockrell .
1,210,589 1/1917 Black .
1,244,586 10/1917 Cockrell .
1,271,139 7/1918 Dickenson .
1,564,181 12/1925 Kellogg .
2,120,138 6/1938 Mathews et al. .
3,062,657 12/1958 Vollink .
3,458,321 7/1969 Reinhart et al. .
3,554,763 1/1971 Fast et al. .
3,682,652 8/1972 Corbin et al. .
3,703,379 11/1972 Cummisford .
3,753,729 8/1973 Harms et al. .
4,217,083 8/1980 Machuque .
4,315,954 2/1982 Kuipers et al. .
4,327,116 4/1982 Weith .
4,350,714 9/1982 Duvall .
4,418,088 11/1983 Cantenot .
4,431,674 2/1984 Fulger et al. .
4,438,146 3/1984 Colby et al. .
4,465,447 8/1984 Cheigh et al. .
4,497,840 2/1985 Gould et al. .
4,500,558 2/1985 Fulger et al. .

FOREIGN PATENT DOCUMENTS

1122849 11/1978 Canada .
2401615 3/1979 France .
558141 2/1946 United Kingdom .
1561190 5/1978 United Kingdom .

Primary Examiner—Donald E. Czaja
Assistant Examiner—Carolyn Paden
Attorney, Agent, or Firm—Richard Kornutik

[57] ABSTRACT

A cereal product is produced continuously from bran using a twin screw extruder which blends and cooks the dry bran with syrup. The cooked mixture is then passed through a headspace between the tips of the extruder screws and the extrusion die, and extruded through a die head having a plurality of bores. The extrudate strands expand only slightly, have a roughened outer surface that is visible to the eye, and spontaneously break into strands almost entirely in the range of 0.1 inch to 2 inches. The strands are then dried and toasted to form bran cereal nuggets.

46 Claims, 3 Drawing Sheets

PROCESS FOR EXTRUSION OF BRAN PRODUCTS

RELATED APPLICATIONS

This application is a continuation-in-part application of U.S. Ser. No. 737,441 filed May 24, 1985.

FIELD OF THE INVENTION

This invention relates to a continuous process for producing an extruded bran cereal product.

BACKGROUND OF THE INVENTION

In the batch production of ready-to-eat bran cereals wheat bran, flour, water, and other ingredients are mixed together with a flavor syrup, cooked, dumped onto a conveyor, processed by an extruder into strands, and then dried and toasted. The first step of this conventional process is the pressure cooking at about 260° F. for one half hour of, for example, a 100 pound batch of wheat bran, 5 percent wheat flour, 7.5 pounds of an alternate flour and a flavoring material. The cooked mixture is extruded under low shear conditions into bran cereal nuggets or "buds" having a "fibrous" appearance. Products produced by this batch process generally stay crisp in milk for about 2–3 minutes. They then lose crispness and their integrity fairly rapidly, in milk or water. Rapid loss of integrity and crispness aids in use of the bran cereal for baking applications, such as in the production of bran cereal biscuits. However, it also may detract from the eating qualities or mouthfeel of the product when used as a breakfast cereal.

U.S. Pat. No. 4,500,558 to Fulger et al. relates to modification of bran by extrusion. In this patent, hereinafter referred to as the '558 patent, a bran and water feed having a bran to water ratio of from 5.5:1 to 10:1 is extruded in a counter-rotating twin-screw extruder under high temperature and high shear conditions. The modified bran according to this process is made more readily millable and, when milled, possesses a "mouth-feel" with an absence of grittiness and a greater "functionality" in a food product. The production of extruded nuggets is not taught.

U.S. Pat. No. 4,438,146, to Colby et al, relates to a method for preparing cooked wheat products. Here, an apparatus and method for cooking wheat products is shown wherein the products are cooked by extrusion through an extrusion die. The extruder is similar to a conventional twin screw extruding device, and the die plates, shown in FIGS. 2, 3, and 5, cause extrusion of the wheat product into strands.

Ground whole wheat is used and mixed with any desired dry ingredients. The cooked edible product is in expanded form. At column 3, lines 1–3, it is taught that an extrusion aid or lubricant may be added to the dough to modify the extrusion pressures. The preferred extrusion lubricant is an edible oil or fat, the extrusion itself providing the heat necessary for the expansion.

As seen in column 3 at lines 11–16, no external heat source is necessary, and because of steam vaporization upon extrusion, the die face itself is cooled so that the outer face of the die has a temperature in the range of 150° F. to 180° F.

Water and/or moisture containing product is added to the other ingredients in the cooker, the water being present in a range of 14 to 18 percent by weight. It is taught in the '146 patent that the level of moisture is important in relation to the development of heat in the die and to the achievement of the desired expansion. As taught at column 5, lines 39–43, the heating and cooking of the dough is primarily done in the die itself. This is also taught in column 5, lines 33–38, wherein it is stated that the heat generated during cooking in the die can require the temperature to be controlled such as with a water cooling jacket or the like around the body or barrel. Such cooling is to control the temperature range of dough entering the die to between ambient temperature (usually about 68° F.–84° F.) and about 180° F. It is also stated in column 5, lines 27–29 that "cooking of the dough in the body or the barrel is not necessary and is to be minimized."

The dough, as taught in the '146 patent, in passing through the die generates heat sufficient to form steam and cook the dough enough to condition the gluten so that upon extrusion the dough expands in a desired form as determined by the die configuration. It is also taught that in the die itself the steam is superheated and reaches a temperature of about 250° F. The fluid friction generates the heat.

U.S. Pat. No. 4,431,674 to Fulger et al relates to an all natural, ready-to-eat cereal derived from whole cereal grain. The process involves milling and separating the whole grain to produce several fractions, including a bran fraction, an endosperm fraction, and a germ fraction. The bran fraction and any bran material separated out from the ground germ is modified by high temperature, high pressure extrusion in a counter-rotating twin screw extruder.

In U.S. Pat. No. 3,682,652 to Corbin et al, a process for preparing a low calorie snack is taught. Here, corn or rice is mixed with water and then extruded under high pressure from the cooking section 13 to atmospheric pressure. Pressurized steam flashes off and inflates the starch mass to a matrix of tenderized dough which becomes firm with drying. Individual pieces are formed with a cut-off knife. The speed of the knives controls the length of the pieces.

In U.S. Pat. No. 2,120,138 to Mathews et al, a method for producing extruded food products is taught. This patent teaches that heat can be supplied in an extruder through the frictional resistance afforded during the grinding and extruding operations, and that in some instances this heat is sufficient for cooking. This patent also relates to an expanded edible product.

U S. Pat. No. 4,217,083 to Machuque discloses a twin-screw extruder for processing dough which includes a diffuser plate and a conical pressure equalization chamber between the tips of the extrusion screws and the nozzle assembly. These components are apparently included to equalize pressure over the nozzle apertures.

In U.S. Pat. No. 3,458,321, to Reinhart et al, a method for extrusion cooking of food products is taught. Here, a twin screw extruder is used. The extruder has a feed section, a cooking section, a devolatilizing section, water and heat are removed from the cooked material, the release of compressive force causing moisture to flash from the cooked material and thereby cool and partially dry the cooked material, which is then extruded. A cereal grain such as corn flour or the like is used, in combination with sugar and other ingredients. The dry ingredients are mixed together with a liquid within the twin screw cooking apparatus. Here, the mechanical forces of the twin screw extruder produce heat due to friction. The pressure applied to the food is taught as being over 1000 psi, and frequently several thousand psi. The food ingredient is gelatinized in the cooking section. Heat jackets are used around the casing 18. Cooling jackets can be used as well. The temperature range in the devolatization zone is approximately 200° F. to about 325° F. At the lower temperature, products are produced which are not puffed, while in the higher temperature range products are produced wherein some puffing has occurred. The temperature range in the metering zone F is between 105° F. and 240° F. The examples teach use of corn together with other ingredients including water. For example, in example I of the '321 patent, the water content raises the moisture to about 27 percent moisture by weight.

Canadian Patent No. 1,122,849 discloses a process for the processing of cereal mixtures comprising 40 to 90 percent bran and no more than 20 percent water, plus a binding agent (sugar, flour or starch) in a twin screw extruder to produce an extruded, expanded product.

U.S. Pat. No. 4,327,116 (Weith) discloses a bran bakery product made from dough composed of 100 parts by weight of bran, 200 to 300 parts by weight of water and 2.5 to 15 parts by weight of carob bean flour (or other vegetable thickening agent). Other conventional dough ingredients such as flavoring agents can be used. Weith specifically mentions wheat bran and rye bran.

U.S Pat. No. 4,350,714 (Duvall) teaches a corn bran, extrusion-cooked, expanded cereal which further contains corn flour, oat flour, ground limestone, [i.e., $CaCO_3$], sugar, salt, soda, vitamin premix and colorant. Duvall states that wheat flour and rice flour can be present. Example 1 shows the use of 25 percent of corn bran flour, and the claims recite that sufficient ground corn bran is used to provide 3.5 to 10 weight percent of fiber. The extruded pieces are enrobed in a syrup which includes sugar, coconut oil and water.

British Patent No. 1,561,190 (Weetabix) discloses a food mixture containing bran and a binding agent (starchy material or gum) mixed with water. The mixture is extrusion cooked. The mixture (on a dry basis) contains 10 to 95 percent of bran. The mixture can also contain wheat and rice flours.

German O.S. No. 2,837,294 (Bories et al.) discloses an extrusion cooked foodstuff composed of bran, 20 to 80 percent; gluten, 5 to 20 percent, and the balance flour or starch, with the addition of 5 to 20 percent water after charging the mixture to an extruder.

According to Lineback et al., "Food Carbohydrates", (1982), page 296, there is not any completely satisfactory definition of the material which is generally referred to as fiber. The indigestible matter in animal feeds has always been designated as "crude fiber", and the term "dietary fiber" has been suggested for the plant cell wall constituents that are not digested by the secretions of the human digestive tract. The current definition of dietary fiber is not entirely satisfactory. There is a distinction between crude fiber and dietary fiber, since the former is a designation of a fraction determined analytically in a manner that gives an approximation of only cellulose and lignin and not of other cell-wall constituents not digested by man.

The substance that the lay public most readily equates with the term dietary fiber is wheat bran. Wheat bran is a heterogeneous substance which contains, in addition to fat and protein, at least 15 different minerals ranging from phosphorus and potassium at 1.04 and 1.38 percent, respectively, to iron (122 ppm), manganese (80 ppm), silicon (35 ppm) and selenium (0.1 ppm). Dietary fibers (or roughage) have been consumed for their laxative properties. The decreased intake of dietary fiber has been implicated as a factor in diseases such as cancer, diabetes and coronary disease.

The present invention provides a continuous process for the production of a high dietary fiber, ready-to-eat bran cereal in a cooker extruder. Upon exiting from the extruder die, the extrudate spontaneously breaks into spoon-sized strands, thereby eliminating the need for a cutting mechanism. The dried and toasted strands have uncut ends and an unplasticized, visibly roughened surface with visibly discrete bran particles. The cereal strands remain crisp in milk for at least 4 minutes. However, the strands lose their integrity in milk or water within less than about 15 minutes for use in baking.

SUMMARY OF THE INVENTION

The present invention provides a continuous process for mixing, cooking and extruding a bran cereal composition in a unitary cooker-extruder in which the cereal composition is cooked without scorching, and is extruded to spontaneously form spoon-sized strands having a visibly roughened surface and an unplasticized appearance with visibly discrete bran particles.

Dry ingredients comprising at least one cereal bran are admixed with a syrup comprising at least one sugar in the mixing zone of a twin screw extruder to form a wetted bran mixture. The wetted bran mixture is cooked in a cooking zone of the extruder to form a cooked bran mixture, and the cooked mixture is passed through a headspace zone adjacent to an extrusion die of the extruder.

The cooked bran is extruded through a die having orifices or bores and the extrudate spontaneously breaks into pieces upon exiting from the die. The pieces fall onto a moving belt and are subsequently dried and toasted. The pressure drop across the extrusion die, the pressure within the extruder, and the temperatures of the components in the extruder are sufficiently low so as to avoid plasticization of the extruded product, the production of smooth, continuous, spaghetti-like strands, and over-expansion of the product. The pressure within the extruder should generally be less than or equal to 400 psig, and the temperature of the ingredients in the extruder should generally be less than or equal to about 270 degrees F. Suitably, the wetted bran mixture is cooked at a temperature in the range of from about 190 degrees F. to about 270 degrees F. and a pressure up to about 120 psig, typically from about 50 psig to about 100 psig. The pressure drop across the die should be from about 100 psi to about 400 psi, more typically from about 140 psi to about 275 psi, and most suitably from about 240 psi to about 260 psi for wheat bran products. The cooked bran is extruded from the headspace zone through the die to the atmosphere at a temperature of from about 170 degrees F. to about 195 degrees F.

Upon extrusion through the die, the cooked bran mixture has a moisture content of from about 25% by weight to about 35% by weight, preferably from about 27% by weight to about 31% by weight, a sugar solids content of from about 10% by weight to about 30% by weight, preferably from about 15% by weight to about 25% by weight, a bran content of from about 30% by weight to about 70% by weight, preferably from about 50% by weight to about 65% by weight, and up to about 10 weight percent, typically up to about 7 weight percent of minor flavoring and texturizing ingredients, said percentages adding up to 100%.

The extrudate is dried to a moisture content of less than or equal to about 6% by weight. The dried and toasted strands have uncut ends and remain crisp in milk for at least 4 minutes. However, the strands soften add lose their cohesiveness in milk or water within less than about 15 minutes for use in baking.

BRIEF DESCRIPTION OF THE DRAWINGS

Apparatus for the production of the extruded bran cereals of the present invention is illustrated in the accompanying drawings wherein.

DETAILED DESCRIPTION OF THE INVENTION

By the present invention, the need for a large amount of floor space and a large number of operators for the batch-type process for the production of ready-to-eat bran cereal is eliminated. A twin screw extruder is used for the continuous mixing and cooking of the ingredients, and forming of the bran product into individual roughened strands of the desired length. No cutting device is necessary in the present invention. The extrudate spontaneously breaks into spoon-sized strands upon exiting from the extruder die. The extruded pieces are dried and toasted to obtain a bran cereal having uncut ends, and an unplasticized visibly roughened surface with visibly discrete bran particles. Cereal products which remain crisp in milk for at least 4 minutes may be produced by the process of the present invention.

In the present process, the dry ingredients are mixed or blended within the extruder by paddles, while syrup is added downstream. The pressure in the mixing or blending zone is typically from ambient to about 50 psig. The temperature in the mixing or blending zone generally ranges from about 75° F. to about 115° F. After the mixing zone is a cooking zone, where heat may be added as by a water or steam jacket adjacent the extrusion apparatus. In this cooking stage, starches are gelatinized, sugars are caramelized, and flavors are developed.

Cereal brans obtained from any of the cereal grains conventionally used in the preparation of food products can be used in the present invention, including brans obtained from wheat, corn, oats, barley, rye, grain sorghum, and mixtures thereof. Wheat bran and mixtures thereof with corn bran are preferred. Suitably, the amount of corn bran may be up to about 25% by weight, based upon the weight of the bran mixture. Commercially available cereal brans may be used in the present invention. They typically have a moisture content of from about 8% to about 15% by weight, more typically from about 10% by weight to about 11% by weight. The cereal bran is added to the extruder in an amount to provide from about 30 weight percent to about 70 weight percent, more typically from about 50 weight percent to about 65 weight percent of bran, based upon the total amount of ingredients added to the extruder, per unit of time. The bran content should be sufficient to provide a dietary fiber content of preferably at least 9 grams per ounce in the final cereal product.

If more than one cereal bran is used, the two types of brans are pre-blended and added directly to the extruder. Other dry ingredients may be dry blended with the at least one cereal bran for direct addition to the extruder. Generally, the bran is at least 90% by weight of the dry ingredients added to the extruder for admixture with the syrup. Non-bran dry ingredients which tend to form lumps upon addition to water or a syrup are preferably pre-blended with the at least one bran for direct addition to the extruder. The remaining ingredients are preferably included in the syrup to facilitate the attainment of a homogeneous wetted bran mixture.

At least one sugar is used as a binder, sweetener, and bulking agent in the methods and compositions of the present invention. The sugar is added to the extruder in the form of a syrup to facilitate the attainment of a homogeneous wetted bran mixture. Sugars which may be used in the present invention include sucrose syrup or liquid sucrose, corn syrup, high fructose corn syrup, honey, molasses, glucose syrup, fructose, lactose, and mixtures thereof. Granulated sucrose may be mixed with water to form a suitable sucrose syrup. Artificial sweeteners such as saccharin, aspartame, TGS, or thaumatin may be used, for example, in combination with corn syrup as a binder. Sucrose syrup is the preferred sugar because of the clean-tasting sweetness of sucrose.

Commercially available sucrose syrups which may be used in the present invention typically have a sugar solids content of from about 65% by weight to about 68% by weight. Commercially available high fructose corn syrups which may be used in the present invention typically possess a sugar solids component of about 40% to about 100% by weight fructose, with the balance of the non-fructose sugar solids being primarily dextrose plus minor mounts of other monosaccharides. The sugar solids content of commercially available high fructose corn syrups typically ranges from about 70% to 73%, up to about 82% by weight.

The amount of sugar which is added to the extruder should be sufficient to bind the bran cereal particles without detracting from the spontaneous formation of spoon-sized strands upon exiting of the extrudate from the extruder die. Suitably, the cooked bran mixture, upon extrusion through the die has a sugar solids content of from about 10% by weight to about 30% by weight, preferably from about 15% by weight to about 25% by weight, based upon the total weight of all the ingredients added to the extruder. In addition, upon extrusion through the die, the cooked bran mixture should have a moisture content which promotes binding of bran particles and the attainment of spontaneous breaking of the extrudate into spoon-sized strands. The cooked bran mixture, upon extrusion through the die, should have a moisture content of from about 25% by weight to about 35% by weight, preferably from about 27% by weight to about 31% by weight.

A portion of the water may be injected into the extruder to mix with and cool the cooked bran mixture. However, to minimize equipment costs, it is preferable to use only two ingredient inputs into the extruder: one for the dry ingredients and one for the syrup. Accordingly, a syrup used in the present invention may include a commercially available sucrose syrup or high fructose corn syrup, additional water, and minor flavoring and/or texturizing ingredients. Suitably, a syrup which is pumped or injected into the extruder for admixture with the at least one cereal bran for forming a wetted bran mixture will have a sugar solids content in the range of from about 20 weight percent to about 70 weight percent, more typically from about 35 weight percent to about 55 weight percent. The optional amount of water which may be directly injected into the cooked bran mixture for cooling may be up to about 5% to about 10% by weight, based upon the total weight of ingredients added to the extruder.

Minor flavoring and/or texturizing ingredients which may be used in the bran cereal compositions of the present invention include at least one of: (a) fruit juices or fruit juice concentrates, such as fig juice, prune juice, apple juice, concentrates thereof, and mixtures of the juices and concentrates, (b) flour such as malt flour, wheat flour, rice flour and mixtures thereof, (c) starches, such as wheat starch or corn starch, (d) dehydrated fruit, and, (e) flavors such as maple, hazelnut, vanilla, and the like. The minor flavoring and texturizing ingredients are suitably used in amounts up to about 10% by weight, typically up to about 7% by weight, based upon the total weight of all of the ingredients added to the extruder. The amount of flour and/or starch should generally be limited so as to avoid overexpansion of the extrudate and/or the formation of strands which are longer than spoon-sized. Generally, the amount of flour and/or starch which is added should be less than about 5% by weight, preferably less than about 3% by weight, based upon the total weight of all the ingredients added to the extruder.

The optional flours and/or starches are preferably dry blended with the at least one bran ingredient for addition to the extruder to avoid lump formation in the syrup. The remaining flavoring and texturizing ingredients are suitably included in the syrup for addition to the extruder where they are mixed with the dry ingredients to form a wetted bran mixture. Fortifying ingredients, such as vitamins and minerals, in conventional amounts, may be also be included in the syrup.

In the process of the present invention, the pressure within the extruder, the pressure drop across the extrusion die, and the temperatures of the components in the extruder are sufficiently low so as to avoid plasticization of the extruded product, the production of smooth, continuous, spaghetti-like strands, and over-expansion of the product. The pressure within the extruder should generally be less than or equal to 400 psig, and the temperature of the ingredients in the extruder should generally be less than or equal to about 270 degrees F. Suitably, the wetted bran mixture is cooked at a temperature in the range of from about 190 degrees F. to about 270 degrees F. and a pressure up to about 120 psig, typically from about 50 psig to about 100 psig. The pressure drop across the die should be from about 100 psi to about 400 psi, more typically from about 140 psi to about 275 psi and most suitably from about 240 psi to about 260 psi for wheat bran products. The cooked bran is extruded from the headspace zone through the die to the atmosphere at a temperature of from about 170 degrees F. to about 195 degrees F.

The extrusion apparatus for use in the present invention is of a modular type, wherein modular elements are various screw types and paddle types. Conveying screws are used in series with paddles which mix and simultaneously selectively reduce or accelerate the rate of forward movement of the material in the extruder. The paddles can be arranged at varying angles of inclination to each other, typically at 45° or 60° angles to one another. These paddle zones, used for mixing, also cause a slowing-down of the forward advance of the mixture. In the present invention, pre-blending of the dry ingredients with water before addition to the extruder is unnecessary. A relatively large blending or mixing zone is used to blend dry ingredients and syrup at relatively low pressure in the twin-screw extruder.

In the present invention a shearing screw, which also reduces the rate of forward advance of material, is also used in the cooking zone for generating heat in the mixture due to friction. Reverse-angled paddles are also used in the cooking zone, with four forwardly advanced paddles and four reversely-positioned paddles suitably being used to hold the material in the cooking zone. Many other paddle configurations are suitable for the cooking zone to achieve cooking of the ingredients. For example, three forward and three reverse-angled paddles, or two forward and two reverse-angled paddles can also be used, depending upon the formulation used. A smaller "push forward" screw is suitably used after the cooking zone. It is contemplated as being within the scope of the present invention, however, to provide any desired configuration which is capable of mixing the ingredients and moving them to the die head under the conditions as described.

From the cooking zone, the cooked bran mixture is mixed and conveyed through a cooling zone, into an unobstructed headspace, and into the bores or orifices of an extrusion die.

For a production-sized twin screw extruder, a die having 280 holes or bores each having a diameter of about 0.093 inches is suitably used. The hole or die orifice diameters may range from 0.01 inches to 0.140 inches. This permits use of a relatively thin die, for example, in the range of about $\frac{3}{8}$ to $1\frac{1}{2}$ inch thick. Die thickness, headspace and extrusion pressure are interrelated in that thicker dies tend to produce higher back pressure in the extruder and more expansion in the product. Once a die is selected which is thick enough to withstand the stress of continuous extrusion operations without adversely affecting the quality of the product, a suitable headspace can be chosen to control the pressure of the mixture which accumulates upstream of the extruder die. A smaller head space or an obstructed headspace compacts the material and would increase the pressure. The head space may be varied by use of die holders which differ in the depth of their hollow portions upstream of the die. Suitably, the headspace has a length of at least about 10% of the length of the screws of the extruder.

Figures 1, 2, 4:
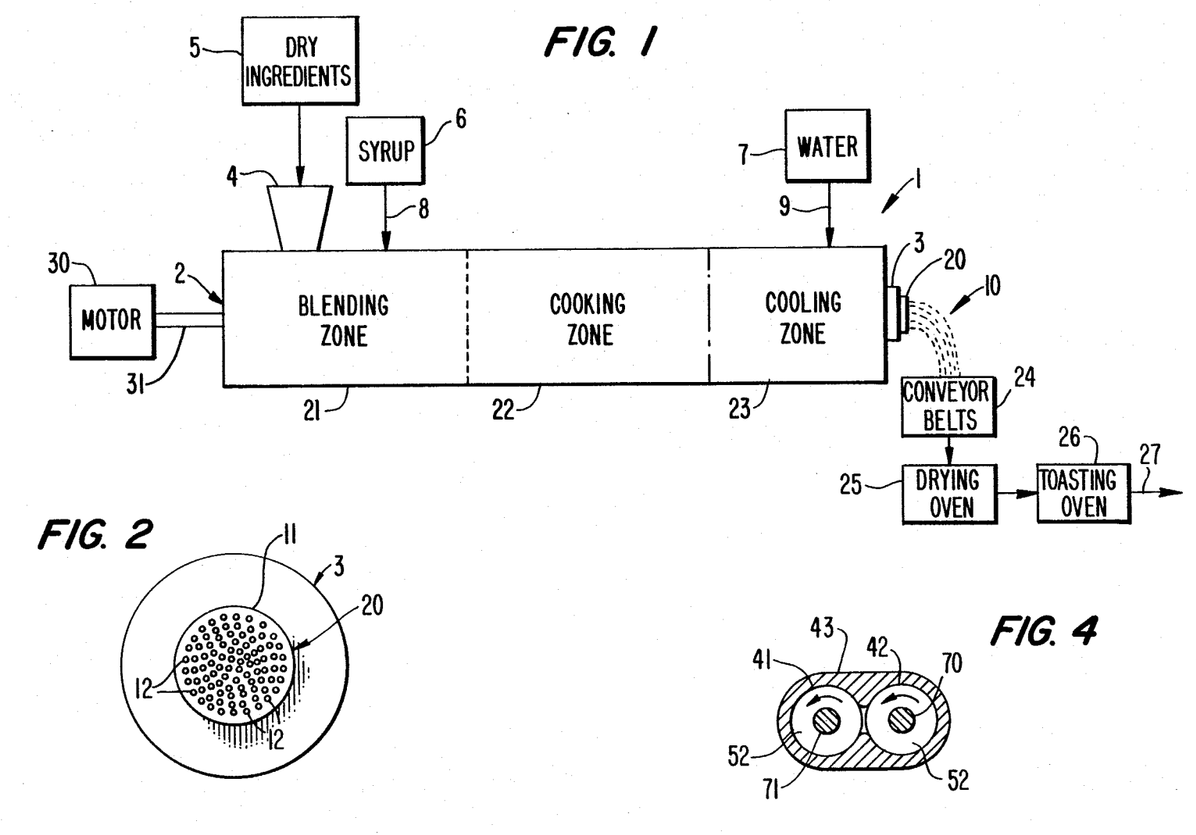
FIG. 1 is a schematic side elevational view of an extrusion apparatus useful in the present invention.
FIG. 2 is a front elevational view of a die head for use in the present invention, shown schematically.
FIG. 4 is a view taken along line 4—4 of FIG. 3.

Referring now to the drawings, FIG. 1 shows a side elevational view of an apparatus 1 according to the present invention. The apparatus 1 includes a twin screw extruder 2, a die mounting block 3, a die head 20, and a funnel 4 for receiving dry ingredients.

Dry ingredients 5 are supplied to a blending zone 21 via the funnel 4. Syrup 6 is supplied downstream into the blending zone 21 of the extruder 2 by a conduit 8 shown schematically in FIG. 1.

A motor 30 drives a shaft 31 to drive the twin screws of the twin screw extruder 2. The syrup 6 and dry ingredients 5 are blended in the blending zone 21 to form a wetted bran mixture. These ingredients are then transported by the extruder 2 to a cooking zone 22, where the ingredients and syrup are cooked. The cooked material is then transported by the extruder 2 to a cooling zone 23. In the cooling zone 23, water 7 is injected through a conduit 9 into a cooling jacket (not shown), as needed, to maintain the temperature of the ingredients in the range of from about 170° F. to about 195° F. upon entry into the extrusion die orifices Alternatively, a portion of the water used to form the syrup may be injected directly via conduit 9 into the cooked bran mixture as it passes through the cooling zone. External cooling may also be used in addition to the direct injection of water into the bran mixture.

The material is then extruded through the die head 20 as extrudate, which spontaneously separates into pieces or strands 10, substantially all having a length in the range of from about 0.1 inch to about 2 inches. Preferably, at least about 75% of the strands have a length of from about ½ inch to about 1 inch. The pieces 10 are conveyed by conveyor belt 24 to a drying oven 25, and thence to a toasting oven 26. The output 27 can be to packaging, storage, or to other locations During movement of the pieces 10 in the drying and toasting oven and during transport of the pieces 10 to the oven the extrudate pieces 10 may break into smaller pieces, usually in the range of 0.1 to one inch in length. Pieces in excess of two inches, for example, may be removed by screening.

FIG. 2 is a front elevational view of the die head or die 20 and the die head support block or die holder 3. The die 20 may be recessed in the die holder 3 and held in place by a flange extending outwardly from perimeter 11. The die 20 has a plurality of orifices 12 therein. The die 20 has a plurality of supporting ribs, not seen in FIG. 2, which are disposed on the opposite side of the die 20 to that shown in FIG. 2. These ribs strengthen the die.

While circular die hole shapes have been discussed, it is contemplated as being within the scope of the present invention to use non-circular die head hole shapes, having cross-sectional shapes such as rectangular, oval, star-shaped, hexagonal, crescent, and the like.

Figure 3:
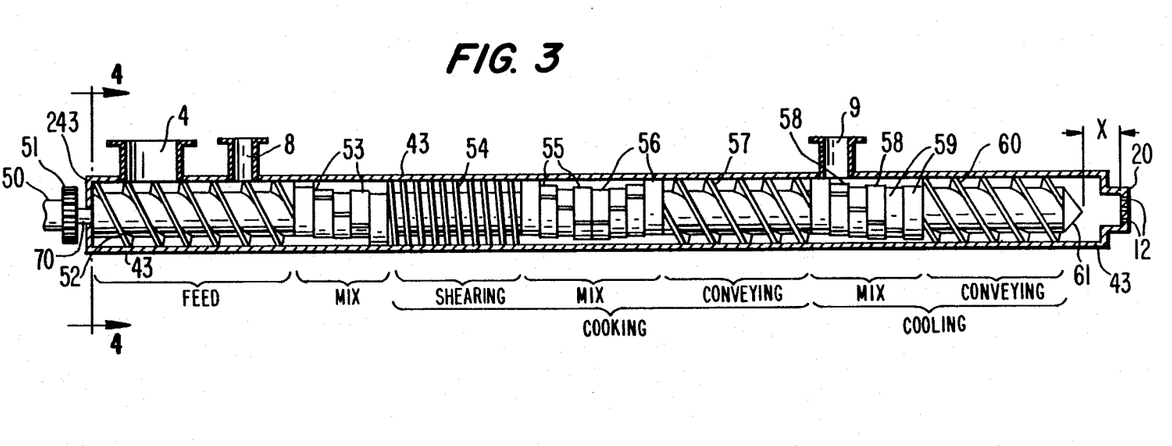
FIG. 3 is a side elevational view of one of the extruder screws useful in the present invention.

FIG. 3 is a side elevational view of one of the shafts of a suitable twin screw extruder, including the modular elements arranged thereon. The walls of the extruder are seen in sectional view, as are the walls of the inlets 4, 8, and 9.

As seen in FIG. 3, a driven shaft 50, shown partially broken away, drives a gear 51. The gear 51 in one type of apparatus drives the other screw of the twin screw assembly. It is, however, possible to independently drive each of the twin screws by separate motors in synchronous relationship, or by a single motor having a gearbox rather than a single gear pair 51.

A shaft 70, upon which the components are mounted in modular relationship, drives the screw. Each of the modular elements is keyed to the shaft 70. A casing 43 closely surrounds the twin screw apparatus, making possible the positive displacement of the material to be extruded.

A conveying screw 52 is seen, which intermeshes with an identical conveying screw 52 mounted upon the other shaft (not seen). In this region, the dry ingredients are supplied to the funnel 4, and the syrup is supplied to the inlet 8. This is labeled as the "feed" region in FIG. 3.

In a mixing region of FIG. 3, adjacent paddles 53 on each shaft 70 are oriented at 45 degree angles to one another in a circular progression along the length of the shaft 70, thus interacting with corresponding paddles on the other screw of the twin screw extruder 2. The paddles of the other shaft (not shown) are arranged similarly, but are oriented at a different angle initially so that the paddles 53 wipe corresponding paddles of the other shaft 70 during operation to force positive material displacement through the extruder, as is well known in the twin screw extruder art. There are five paddles 53 shown in FIG. 3, however, varying numbers of paddles as well as varying types and lengths of screws can be used to produce a satisfactory product.

The mixing paddles used to mix the syrup with the dry ingredients are used for thorough mixing since the syrup is absorbed relatively slowly. The dry ingredients and syrup are mixed at temperatures ranging from ambient to about 115° F. and pressures up to about 50 psig to form a wetted bran mixture.

In the method of the present invention, the extruder is preferably operated at a through-put level considerably less than the designed maximum, generally in the range of about 40 to about 60 percent of capacity. Under such conditions, the amount of torque applied to rotate the screws at the intended rate need only be in the range of from about 40 to about 50 percent of the rated maximum amount, and extrusion conditions for a given extruder setup can be conveniently regulated by varying the extruder torque.

After the first mixing zone, the dry ingredients 5 and syrup 6, now mixed together, are transported to a cooking zone. In the cooking zone, starches are gelatinized, sugars are caramelized, and flavors are developed. In this cooking zone, heat generated by friction and fluid shear is used to elevate the temperature of the materials to cooking temperatures in the range of from about 190° F. to about 270° F. External heating or cooling can be supplied by jackets (not shown) to this zone as well as to the other zones. The auxiliary heating or cooling is suitably used to control barrel temperatures to maintain predetermined temperature settings during operations. The pressure in the cooking zone generally ranges up to about 120 psig, typically from about 50 psig to about 100 psig.

A shearing screw 54 is shown in a shearing region of the cooking zone. This screw 54 has a narrow lead and pitch, and causes increased pressure to exist in the material to be extruded. A correspond shearing screw 54 is located on the other screw of the twin screw extruder 2, for engagement with the shearing screw 54 shown in FIG. 3, to cause positive displacement of the material to be extruded. Suitably, the shearing action is high enough to obtain cooking temperatures up to the range of from about 190° F. to about 270° F. with minimal external heating. Typically, the wetted bran mixture is heated to at least about 135° F. in the shearing section of the cooking zone.

Following the shearing region is a "mix" region of the cooking zone. Here, four paddles 55 are arranged at 45 degree angles along a circular direction. Four additional paddles 56 are arranged in an opposite circular direction, at 45 degree angles to one another, to aid in retaining the material in the cooking zone. This also causes a pressure build-up in the extruder.

Following the "mix" region of the cooking zone is a conveying screw 57. As with the other elements, the paddles 55, 56, and 57 all have corresponding mating elements mounted on the other one of the two twin screws of the extruder 2. This results in positive displacement of the material to be extruded.

The conveying screw 57 conveys the material to a cooling zone. In the cooling zone, four paddles 58 are provided at 45 degree angles to one another for further mixing of the material. Directly following the paddles 58 are a pair of paddles 59 which are oriented at 90 degree angles to one another. The paddles 59 cause increased blending of the material. As with the other elements, corresponding mating paddles 58, 59 are provided on the other one of the two twin screw extruder shafts 70, which wipe the opposing paddles 58, 59 as is well known in the art.

A conveying screw 60 is located in a conveying region of the cooling zone. The conveying screw 60 conveys material to the tip 61 of the screw 60. An unobstructed headspace distance X exists between the tip 61 and the inlets to the bores or orifices of the die 20. The headspace should be an amount effective to maintain the pressure of the cooked mixture adjacent to the die within the desired range for extrusion under the intended operating conditions. The length of the headspace is suitably at least about 10% of the length of the twin screw within the extruder barrel. In FIG. 3, the length of the twin screw extends from the inside wall of end 243 downstream to the end of tip 61. As the headspace is decreased the material tends to compact and the pressure increases. The die 20 is seen in sectional view in FIG. 3, and several of the passages 12 are shown in this figure.

The introduction of water 7 through conduit 9 into a jacket (not shown) around the cooling zone 23 may be used to maintain the temperature of the cooked bran mixture at about 170° F. to about 195° F. In FIG. 3, the conduit 9 is shown as connected directly to the cooling zone itself rather than to a cooling jacket, so that water can be injected directly into the cooked mixture to cool the mixture and provide additional moisture. Extruders with such conduit arrangements are commercially available. However, because direct injection requires additional pumps and controls, it is preferred to rely upon external cooling means.

The ratio of the length to the diameter of the extruder shaft from beginning to end can be in a range of 5:1 to 100:1. A suitable ratio is about 15:1.

A twin screw extruder which is suitable for use in the process of the present invention is a Baker Perkins twin screw multi-purpose food extrusion system, model no. MPF-50D. This model has a clam shell casing arrangement, modular screw and paddle elements, and cooling and heating capabilities for supplying external heat and for supplying cooling externally to the casing 43. Other twin screw food extruders found suitable for use in the present invention are model WENGER TX by Wenger of Sabetha, Kan., and models MPF80 and MPF80-L by Baker Perkins.

Generally, with products containing a relatively high sugar content, e.g., greater than about 15 weight percent, a higher moisture content must also be used to prevent scorching of the sugars during cooking. The twin screw extruder has been found to be particularly suitable for the method of the present invention. It can be used to process mixtures with much higher sugar content than a single screw extruder will accomodate without scorching. Quick cooking, without overworking of the bran mixture is desirable to minimize the breakdown of vitamins and volatile flavors and to retain bran particle sizes within a visually apparent range.

FIG. 4 is a view taken along line 4—4 of FIG. 3. Here, a pair of shafts 70, 71 are shown, both rotating in the same direction. This is known as a "co-rotating" twin screw arrangement and is most preferred for use in the present invention. In a co-rotating arrangement, both barrels contain elements having the same orientation, that is, both barrels have left handed screw threads, or else both are right handed screw threads. In counter-rotating twin screw extruders, the conveying and high shear screws of each barrel have opposing left-hand and right-hand orientations.

The barrel 43 closely fits the external periphery of screw elements 52, 52. The directions of rotation are shown by arrows in FIG. 4. All of the rotating elements pass closely adjacent at least a portion of the interior of the barrel 43, to produce a positive material displacement.

Figure 5:
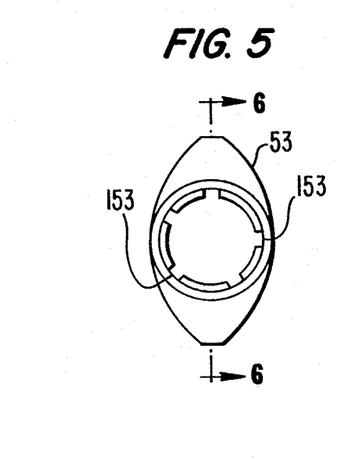
FIG. 5 is a front elevational view of a paddle used in the present invention.

FIG. 5 is a front elevational view of a paddle 53 for use in the present invention. The paddle 53 has a plurality of slots 153 therein, for keying to one of the shafts 70, 71.

Figure 6:
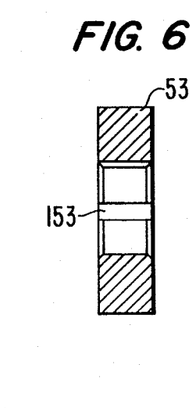
FIG. 6 is a sectional view taken along line 6—6 of FIG. 5.

FIG. 6 is a sectional view taken along line 6—6 of FIG. 5, showing the interior rounded surface of the paddle 53 and the slot 153.

Figure 7:
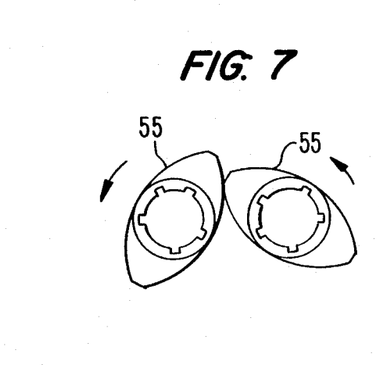
FIG. 7 is a front elevational view of a pair of paddles in rotary relationship during operation.

FIG. 7 is a schematic view of a pair of paddles 55, 55, rotating on respective twin screw shafts (shafts not shown in FIG. 7). Arrows indicate the direction of rotation of the paddles 55, 55. As seen in FIG. 5, the paddles exhibit a "wiping" action during rotation The wiping action results in positive material flow through the extruder, as well as in self-cleaning during operation of the paddles. The other paddles 53, 56, 58, and 59, also are self-wiping in the preferred embodiment.

Figure 8:
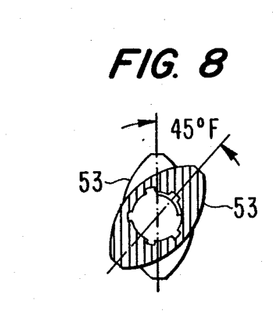
FIG. 8 is a front elevational view, partially in section, of a pair of paddles mounted upon the same shaft.

FIG. 8 is a front elevational view, partially in section, showing the 45 degree angle F orientation of two consecutive paddles 53, 53 mounted upon a single one of the two shafts.

Figure 9:
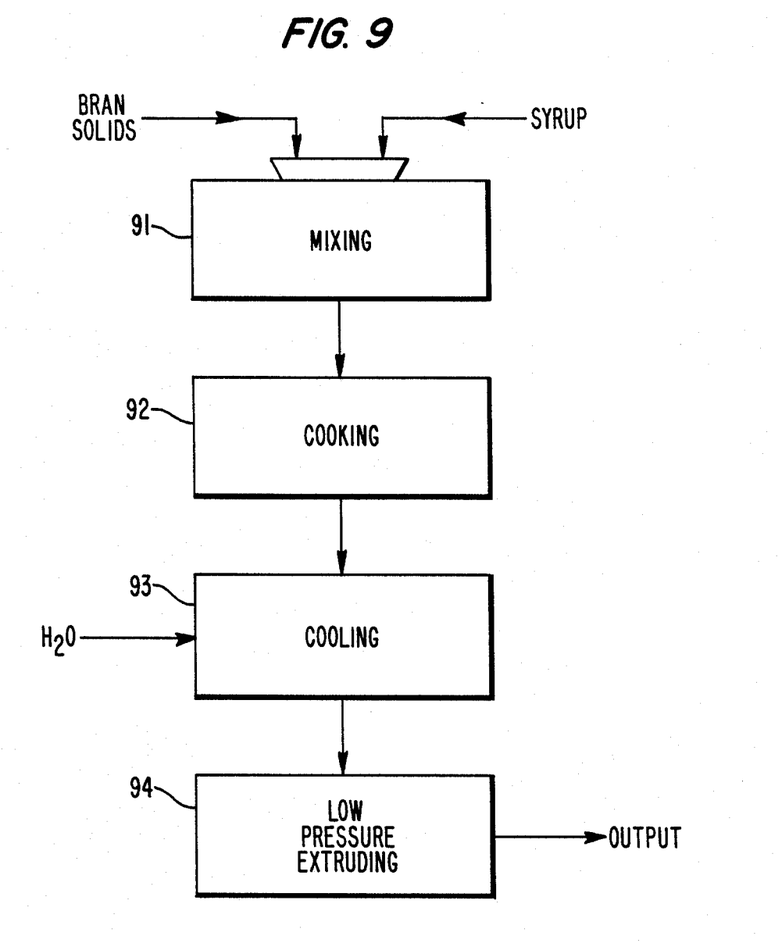
FIG. 9 is a process diagram showing an embodiment of the present invention.

FIG. 9 is a process diagram of the process according to the present invention. Bran solids and syrup are added as indicated at 91 and mixed. The mixture is then cooked at a cooking step 92 and cooled as necessary at cooling step 93.

The cooled mixture is then extruded at low pressure, of approximately 100–400 psig at the extruding step 94. The residence time of the bran in the extruder typically ranges from about 19 seconds to about 27 seconds. The output is composed of spoon-sized strands of bran extrudate. Typically, substantially all of the strands are in pieces of approximately 0.1 to 2 inches in length. The increase in diameter of the strands over the diameter of the orifices or bores of the die is suitably less than about 30%.

The extrudate need not be used directly in the bud or strand form. For example, it can be further processed into flakes, prior to drying and toasting or it can be powdered after drying or toasting.

The extruded product is dried and toasted to a shelf-stable water activity of less than or equal to about 0.7. The dried and toasted product suitably possesses a moisture content of less than or equal to about 6% by weight, typically from about $2\frac{1}{2}\%$ to about $4\frac{1}{2}\%$ by weight. Suitable drying and toasting temperatures and times range from about 450° F. to about 480° F. for about 80 seconds to about 100 seconds. The final product may be admixed with dehydrated fruit, such as raisins. The bran cereal should then preferably have a moisture content of from about 4% to about 6% by weight.

The final product bulk density of the cereal is preferably approximately 15 to 16.5 pounds per cubic foot. The bran cereal of the present invention exhibits crispness in milk, yet is readily for baking applications such as the production of bran biscuits. Suitably, the bran nuggets lose their integrity in milk or water within less than about 15 minutes.

The following example further illustrates the present invention, wherein all temperatures are in degrees Fahrenheit, and all parts, percentages, and ratios are by weight unless otherwise indicated:

EXAMPLE I

The ingredients and their relative amounts used to produce a ready-to-eat bran cereal were:

| Ingredient | Percent of Total Materials by Weight |
| --- | --- |
| Raw Wheat bran (about 10.5% water by weight, and about 45.6% fiber by weight) | 55.5 |
| Malt Flour (about 7.2% water by weight and about 6.2% fiber by weight) | 1.4 |
| Liquid Sucrose (about 67% sugar Solids and about 33% water by weight) | 23.0 |
| Water | 16.2 |
| Salt | 1.1 |
| Fig Juice Concentrate (about 30.6% water and 1.5% fiber by weight) | 1.3 |
| Prune Juice Concentrate (about 30.6% water and 6% fiber by weight) | 1.3 |
| Vitamin premix | 0.2 |
|  | 100.0 |

The raw wheat bran and malt flour were dry mixed to form a substantially homogeneous dry ingredient mixture. The remaining ingredients were mixed to form a syrup. The syrup and the dry ingredient mixture were separately and continuously fed to a corotating twin screw cooker extruder at feed rates of about 3.6 lb/min. and 4.8 lb/min., respectfully. A vibratory feeder was used to feed the dry ingredient mixture to the extruder.

Paddles and screws, were arranged on the screw shafts from upstream to downstream to provide: (a) blending and mixing of the dry ingredient mixture with the syrup, (b) shearing, mixing, and conveying of the wetted bran mixture during cooking, and (c) mixing and conveying of the cooked bran to the die. Between the screw tip and the die there was an unobstructed head space of about 3½ inches. The die had about 0.093 inch diameter orifices. The syrup was injected downstream from the input of the dry ingredient mixture. Both the syrup and the bran were fed into the blending and mixing zone of the extruder. The screws were rotated at 450 rpm, at about 42–43 percent of maximum torque. On a calculated basis, the water content of the wetted bran mixture formed in the extruder was about 30.5% by weight.

The extruder had five jacketed zones for controlling the temperature of the ingredients in the extruder. Each zone contained a temperature probe for contact with the ingredients in the extruder. Temperature readings were taken at about 15 minute intervals in each of the five zones. The average measured temperatures were, from upstream to downstream: (a) 95° F. in the zone for mixing the dry ingredients and the syrup, (b) 142° F., 197° F., and 242° F. in the shear zone, mixing zone, and conveying zones, respectfully for cooking of the wetted bran mixture, and (c) about 210° F. in the zone for mixing and cooling of the cooked bran mixture. The zone temperatures fluctuated less than 5° F. between any two time intervals.

The temperature of the cooked and cooled product was measured with a probe in the head space, immediately prior to the die orifices or bore inlets. The average measured temperature was about 183° F. The die was not externally heated or cooled. The pressure in the headspace immediately prior to the die orifice inlets was measured at 15 minute intervals. The die head pressure ranged from 240 psig to 260 psig and averaged 245 psig.

As the product was extruded, it spontaneously separated into short lengths ranging from about 0.1 to 2 inches, with about 80 to 85% of the pieces having a length of from about ⅛ inch to about one inch. As the pieces were falling from the die outlet, a sample was collected at regular intervals in a cup and the temperature of the product in the cup was measured. The average temperature was about 181° F. The moisture content of the extruded pieces was about 28.1%, as measured in a Computrac Moisture Analyzer set at 130° C.

The extruded product was transported by conveyer belts to a toasting and drying oven. The product was dried and toasted in a two zone oven at about 480° F. in the first zone and about 465° F. in the second zone for about 90 seconds. The dried product bulk density was about 15.6 lb./ft$^3$ after the drying and toasting. It had a moisture content of about 2.5% by weight and a fiber content of about 36% by weight. The diameter of the dried product was about 3 mm. The surface of the dried product had an unplasticized visibly roughened or feathered appearance. The product stays crisp in milk for about 5 minutes.

What is claimed is:

1. A method for continuously producing a bran cereal product comprising:
   (a) admixing at least one cereal bran with a syrup in the mixing zone of a twin screw extruder to form a wetted bran mixture,
   (b) cooking the wetted bran mixture in a cooking zone of said extruder to form a cooked bran mixture,
   (c) passing the cooked mixture through a headspace zone adjacent to an extrusion die, and
   (d) extruding said cooked bran mixture through said extrusion die, wherein the extrudate spontaneously breaks into strands having a visibly roughened surface.

2. A method in accordance with claim 1 wherein said syrup comprises water and sucrose and said wetted bran mixture has a moisture content of from about 25 weight percent to about 35 weight percent, based upon the total weight of said mixture.

3. A method in accordance with claim 1 wherein said cooked bran mixture has a moisture content in the range of from about 25 weight percent to about 35 weight percent upon extrusion through said extrusion die.

4. A method in accordance with claim 1 wherein said wetted bran mixture has a moisture content in the range of from about 27 weight percent to about 31 weight percent.

5. A method in accordance with claim 1 wherein said wetted bran mixture has a sugar solids content in the range of from about 10 weight percent to about 30 weight percent.

6. A method in accordance with claim 2 wherein said wetted bran mixture has a sugar solids content in the range of from about 15 weight content to about 25 weight percent.

7. A method in accordance with claim 1 wherein said syrup has a sugar solids content in the range of from about 20 weight percent to about 70 weight percent.

8. A method in accordance with claim 7 wherein said syrup has a sugar solids content in the range of from about 35 weight percent to about 55 weight percent.

9. A method in accordance with claim 2 wherein said syrup has a sugar solids content in the range of from about 35 weight percent to about 55 weight percent.

10. A method in accordance with claim 7 wherein said sugar solids comprise sucrose.

11. A method in accordance with claim 7 wherein said syrup comprises a corn syrup or a high fructose corn syrup.

12. A method in accordance with claim 1 wherein said bran mixture is cooked at a temperature in the range of from about 190° F. to about 270° F. and a pressure in the range of from about 50 psig to about 90 psig.

13. A method in accordance with claim 1 wherein the pressure drop across said die is in the range of from about 100 to about 400 psi and the extrudate from said die has a temperature of from about 170° F. to about 195° F.

14. A method in accordance with claim 1 wherein the pressure drop across said die is in the range of from about 140 to about 275 psi.

15. A method in accordance with claim 1 wherein the pressure drop across said die is in the range of from about 240 to about 260 psi.

16. A method in accordance with claim 1 wherein said at least one cereal bran is selected from the group consisting of wheat bran, corn bran, oat bran, barley bran, rye bran and grain sorghum bran.

17. A method in accordance with claim 1 wherein the dry ingredients added to said extruder for admixture with said syrup contain at least about 90 weight percent of said at least one cereal bran.

18. A method in accordance with claim 1 wherein said at least one bran comprises a mixture of wheat bran and corn bran.

19. A method in accordance with claim 1 wherein the dry ingredients admixed with said syrup consist essentially of said at least one cereal bran.

20. A method in accordance with claim 3 wherein water is injected into the extruder to mix with and cool the cooked bran mixture in a zone upstream of said headspace.

21. A method in accordance with claim 1 wherein said extrudate spontaneously breaks into strands, substantially all having lengths in the range of from about 0.1 to about 2 inches.

22. A method in accordance with claim 1 wherein said extruded product contains visibly discrete bran particles.

23. A method in accordance with claim 1 wherein at least about 75% of said strands have a length of from about ½ inch to about 1 inch.

24. A method in accordance with claim 1, wherein said strands are dried and toasted.

25. A method in accordance with claim 1 wherein the residence time of said at least one bran mixture in the extruder ranges from about 19 seconds to about 27 seconds.

26. A method in accordance with claim 21 wherein said wetted bran mixture has a moisture content in the range of from about 25 to about 35 weight percent and a sugar content in the range of from about 10 to about 30 weight percent.

27. A method in accordance with claim 26 wherein said at least one bran is raw wheat bran, said wheat bran being from about 30 weight percent to about 70 weight percent of said wetted bran mixture.

28. A method in accordance with claim 1 wherein said cooked bran mixture is cooled by external cooling means downstream of said cooking zone.

29. A method in accordance with claim 1 wherein said cooked bran mixture is cooled by the direct injection of water downstream of said cooking zone.

30. An extruded bran cereal product obtained in accordance with the method of claim 1 having a fiber content of at least about 9 gms/oz.

31. An extruded corn bran cereal product obtained in accordance with the method of claim 18 having a fiber content of at least about 9 gms/oz.

32. An extruded bran cereal product obtained in accordance with the method of claim 21.

33. An extruded bran cereal product obtained in accordance with the method of claim 24 having a fiber content of at least about 9 gms/oz.

34. An extruded bran cereal product as claimed in claim 30 which remains crispy in milk for at least four minutes.

35. A method for continuously producing an extruded bran cereal product comprising:
(a) admixing at least one cereal bran with water in a twin screw extruder to form a wetted bran mixture,
(b) cooking the wetted bran mixture in a cooking zone of said extruder to form a cooked bran mixture,
(c) cooling said cooked bran mixture in a cooling zone of the extruder,
(d) passing the resulting cooked, cooled bran mixture through a headspace zone lying between the ends of the extruder screws and an extrusion die, and
(e) extruding said cooked bran mixture through said extrusion die,
wherein the pressure in the extruder is less than or equal to about 400 psig, the temperature of the ingredients in the extruder is less than or equal to about 270° F., and the extrudate spontaneously separates into strands substantially all having lengths in the range of from about 0.1 to 2 inches and having a visibly roughened surface.

36. A method in accordance with claim 35 wherein water is injected into the cooked bran mixture in step (c) to cool it.

37. A method as claimed in claim 35 wherein upon extrusion through the extrusion die, the cooked bran mixture of step (e) has a moisture content of about 25% by weight to about 35% by weight, a sugar solids content of from about 10% by weight to about 30% by weight, a bran content of from about 30 weight percent to about 70 weight percent, and up to about 10 weight percent of minor flavoring and texturizing ingredients, said percentages adding up to 100%.

38. A method as claimed in claim 35 wherein the length of said headspace is at least about 10% of the length of said screws.

39. An extruded ready-to-eat cereal comprising cooked cereal bran and sugar, said cereal being in the form of spoon-sized strands having uncut ends and an unplasticized, visibly roughened surface wherein the cereal has a dietary fiber content of at least 9 grams per ounce and remains crisp in milk for at least 4 minutes, said strands losing their integrity in milk in less than about 15 minutes.

40. An extruded ready-to-eat cereal as claimed in claim 39 wherein said cereal bran comprises wheat bran and said sugar comprises sucrose, and the water content of the cereal is less than or equal to about 6 percent by weight.

41. An extruded ready-to-eat cereal as claimed in claim 39 wherein said cereal bran comprises wheat bran and corn bran, the amount of corn bran being up to about 25 weight percent, based upon the total weight of the cereal bran.

42. An extruded ready-to-eat cereal as claimed in claim 39 wherein said sugar comprises a corn syrup, a high fructose corn syrup, sucrose, or mixture thereof.

43. A bran cereal product as claimed in claim 33, having a bulk density of from about 15 to 16.5 pounds per cubic foot.

44. An extruded bran cereal product obtained in accordance with the method of claim 29.

45. An extruded bran cereal product obtained in accordance with the method of claim 35.

46. An extruded bran cereal product obtained in accordance with the method of claim 36.

* * * * *